Figures 2, 3:
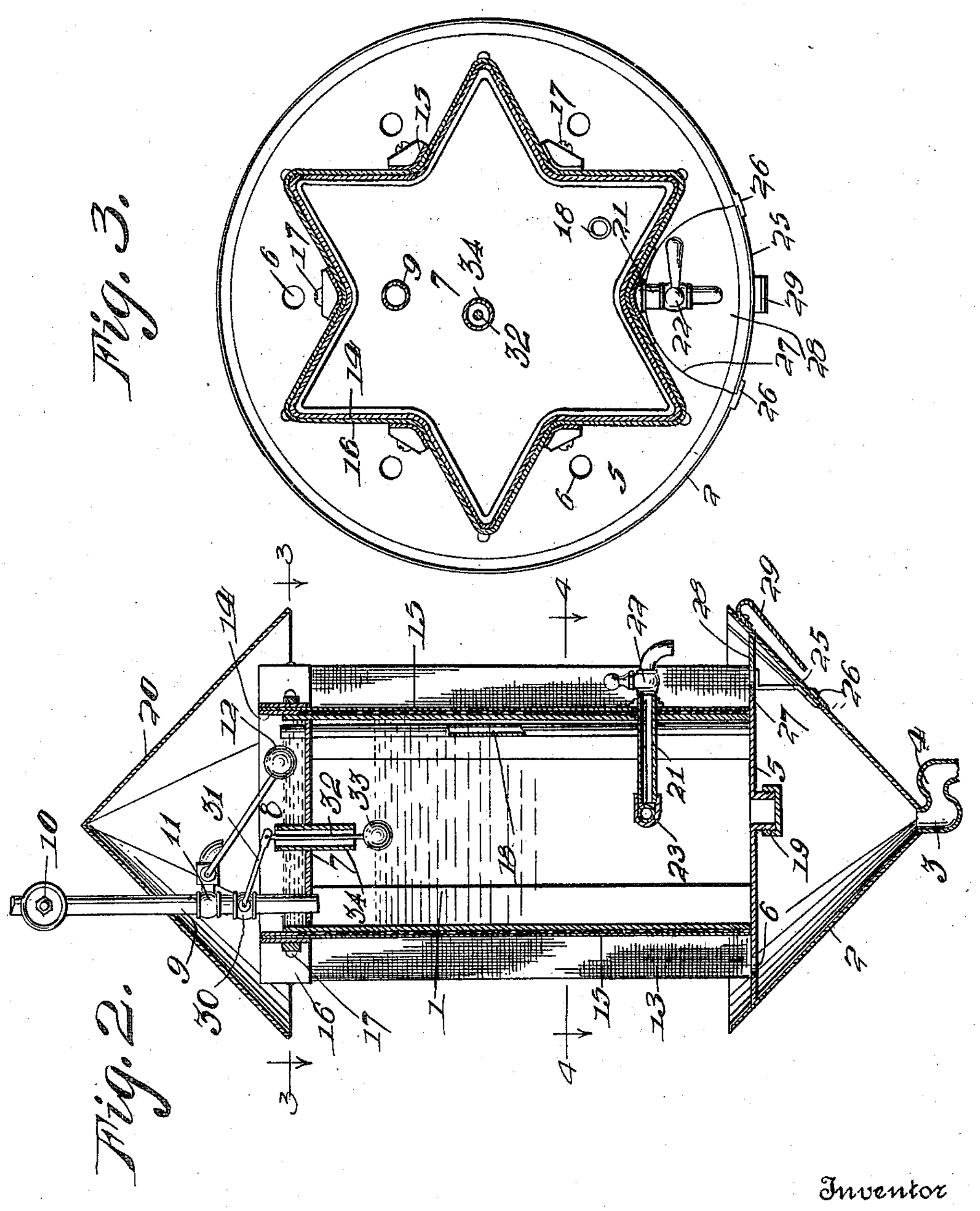

R. W. AMMONS.
WATER COOLER.
APPLICATION FILED DEC. 30, 1909.
964,734. Patented July 19, 1910.
2 SHEETS—SHEET 1.
Fig. 4.
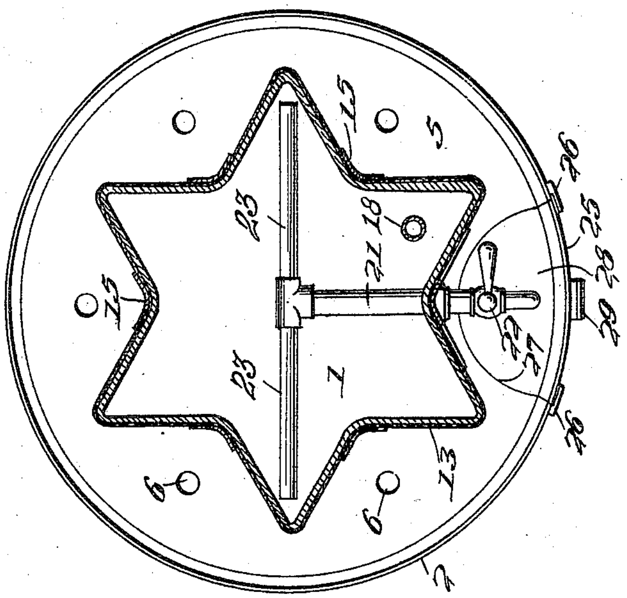
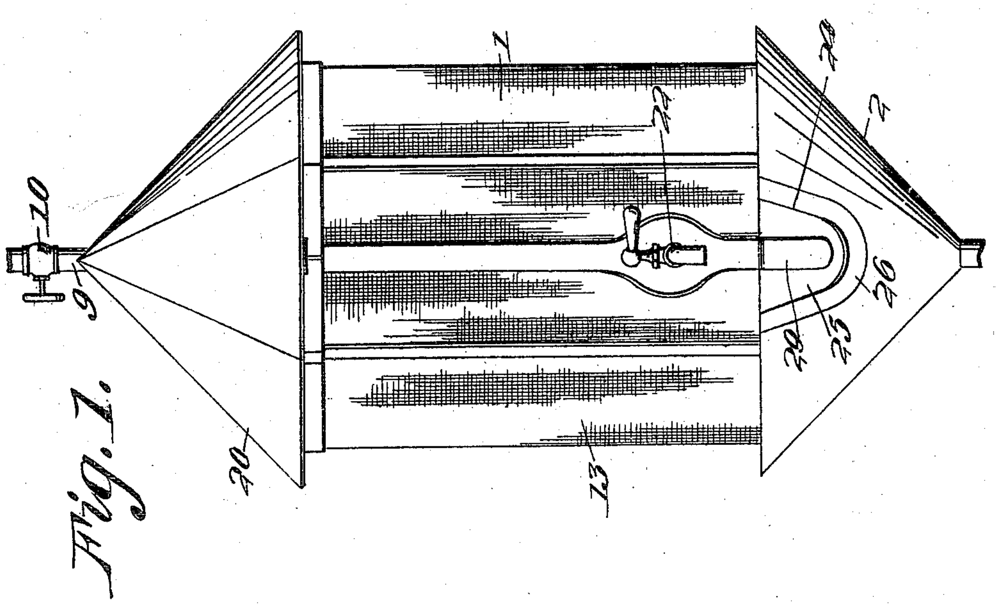
Fig. 1.
Witnesses
E. D. B. Brown.
C. H. Griesbauer.
Inventor
R. W. Ammons,
by A. B. Willson & Co.
Attorneys
THE NORRIS PETERS CO., WASHINGTON, D. C.

R. W. AMMONS.
WATER COOLER.
APPLICATION FILED DEC. 30, 1909.

964,734. Patented July 19, 1910.

2 SHEETS—SHEET 2.

Inventor
R. W. Ammons,

Witnesses
E. O. B. Brown.
C. H. Griesbauer by H. B. Willson & Co
Attorneys

THE NORRIS PETERS CO., WASHINGTON, D. C.

UNITED STATES PATENT OFFICE.

RALPH WALDO AMMONS, OF DELANO, CALIFORNIA.

WATER-COOLER.

964,734. Specification of Letters Patent. Patented July 19, 1910.
Application filed December 30, 1909. Serial No. 535,570.

*To all whom it may concern:*

Be it known that I, Ralph Waldo Ammons, a citizen of the United States, residing at Delano, in the county of Kern and State of California, have invented certain new and useful Improvements in Water-Coolers; and I do declare the following to be a full, clear, and exact description of the invention, such as will enable others skilled in the art to which it appertains to make and use the same.

This invention relates to improvements in water coolers.

One object of the invention is to provide a cooler in which the contents thereof are cooled by the rapid evaporation of moisture from the outside of the receptacle or cooler.

Another object is to provide a cooler of this character having an improved means for supplying and controlling the cooling moisture and for holding the same in contact with the receptacle.

With the foregoing and other objects in view, the invention consists of certain novel features of construction, combination and arrangement of parts, as will be more fully described and particularly pointed out in the appended claims.

In the accompanying drawings, Figure 1 is a side view of the cooler constructed in accordance with the invention; Fig. 2 is a central vertical section taken on a line with the water supply pipe and the discharge faucet of the cooler; Fig. 3 is a horizontal sectional view on the line 3—3 of Fig. 2; Fig. 4 is a similar view on the line 4—4 of Fig. 2.

Referring more particularly to the drawings, 1 denotes the tank or receptacle of the cooler which is preferably formed of non-corrosive sheet metal and is of irregular shape in cross section, the same being here shown as having the form of a six-pointed star. The sides of the tank are thus irregularly formed in order to provide a larger area or evaporating surface for the cooling moisture. The lower end of the tank is closed by a conically shaped bottom 2 which is connected with the waste pipe 3 having a trap or shield 4. The waste pipe 3 may connect with the sewer or any other place of discharge.

The bottom 2 is of sufficient size at its upper end to project beyond the sides of the bottom portion of the cylinder 1, which is closed by a bottom plate 5. The bottom plate 5 extends laterally beyond the cylinder 1 and is connected with the inner side of the conically shaped bottom member 2 and the projecting portions of the bottom plate beyond the sides of the receptacle have formed therein waste water passages 6, through which any moisture which does not evaporate from the outer sides of the tank will pass into the conical shaped bottom section and will be discharged thereby into the waste pipe.

In the upper portion of the tank 1 is arranged a horizontal partition in the form of a plate 7, said plate being secured in the receptacle at a suitable distance below the upper end thereof to form a cooling water receptacle 8. Extending into the tank or cylinder 1 through the top plate 7 is a water supply pipe 9 having arranged therein a cut-off valve 10 and an automatically operated controlling valve 11, which is adapted to discharge water into the receptacle 8 which supplies the cooling moisture, as will be hereinafter described.

The valve 11 is controlled by means of a float 12 which is suitably connected to the stem of the valve and is adapted to open and close the same as the water in the receptacle 8 lowers or rises, thus maintaining this water at the proper level.

Around the outer side of the tank 1 is arranged a covering 13 of burlap or other suitable material which is kept moistened by the water in the receptacle 8, said water being fed to the burlap through capillary attraction and by means of a wick 14, consisting of a strip of felt or other suitable material which is arranged around the outer side of the receptacle 8 of the tank and projects a suitable distance above the same.

The projecting upper portion of the wick is saturated by the overflow of the water in the receptacle 8 and thus conveys this overflow water to the burlap covering keeping the same moistened at all times. The burlap covering 13 is held in proper engagement with the outer sides of the tank by angular clamping strips 15 which are arranged in the inner corners of the star-shaped sides of the tank, as shown. Arranged around the wick 14 at the upper end of the frame is a clamping strip 16, which is adapted to be drawn into more or less tight engagement with the wick by means of clamping bolts 17. By means of the clamping strip 16, the wick may be compressed to a greater or less degree against the outer sides of the tank or receptacle, thus regulating the amount of moisture absorbed thereby and conveyed to the burlap. It will thus be seen that the amount of moisture supplied to the burlap may be readily controlled.

In the tank is arranged an overflow pipe 18 the upper end of which extends through the top plate 7 and projects a suitable distance above the same and into the receptacle 8. The lower end of the overflow pipe passes through the bottom plate 5 and communicates with the conically shaped bottom section of the tank. By providing an overflow pipe 18, the water in the receptacle 8 will be prevented from rising too high therein should the automatically controlled valve 11 fail to operate.

In the bottom plate 5 is formed a clean out opening which is normally closed by a removable plug or cap 19. Over the upper end of the tank is preferably arranged a conically shaped top 20, which is formed in sections to permit the same to be readily removed when desired.

In one side of the tank near the bottom of the same is arranged a discharge pipe 21, on the outer end of which is secured a discharge faucet 22, and on the inner end of said pipe is secured a T in which are arranged oppositely projecting branch pipes 23, said pipes extending to near the sides of the cooler whereby the water drawn therefrom will be taken from the coolest part of the same. In one side of the conically shaped bottom section 2 of the cooler immediately below the faucet 22 is formed a substantially U-shaped opening 24 which is normally closed by a segmental covering plate 25. The plate 25 is held in engagement with the edges of the opening 24 by means of a flange 26, secured to the side of the bottom 2 as shown. The bottom plate 5 opposite to the opening 24 is also cut away to provide an opening or recess 27 which is normally closed by a segmental plate 28 secured to and carried by the plate 25 which closes the opening 24.

The plate 25 is preferably provided with a suitable handle 29 to facilitate the removal and replacing of the same over the opening 24. The opening 24 and the recess 27 are provided to permit the insertion of a pitcher or other container beneath the faucet whereby the contents of the cooler may be drawn into the container.

The opening 24 also permits the insertion of the hand for the purpose of removing the cleaning plug or cap 19. The faucet is preferably arranged a sufficient distance above the upper edge of the bottom section 2 to permit the insertion of a glass or cup beneath the same without removing the covering plate 25, and said faucet does not project beyond the upper edge of the bottom 2 so that any water dripping from the faucet will be caught by the upper portion of the bottom section and conveyed thereby to the waste pipe.

In order to prevent injury to the tank from over pressure as when the cooler is connected to high pressure water systems, I provide means for automatically turning off the water when the same has reached a predetermined level in the tank. The means for turning off the water supply consists of an auxiliary cut-off valve 30 arranged in the water supply pipe 9 below the valve 11. To the stem of the valve 30 is secured a crank arm 31 which is connected at its outer end by an operating rod 32 to a float 33 arranged in the tank near its upper end as shown.

The rod 32 works through a tube 34 fixed in the top plate 7 of the tank. The upper end of the tube 34 projects above the upper end of the overflow tube 18 so that none of the water in the receptacle 8 can run through the tube 34 and into the tank.

When the water in the tank reaches the float 33, the same will be raised, thus lifting the rod 32 and arm 31 thereby cutting off the supply of water until some of the water has been drawn from the tank and the valve again permitted to lower and thus open the valve. Should the float for any reason fail to close the valve the water in the tank will overflow through the tube 34 into the receptacle 8 and be carried off by the overflow pipe 18, thus relieving the pressure in the tank.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:—

1. In a water cooler, a tank having a water receptacle at its upper end, a water supply pipe connected with said tank and with said receptacle, an automatically controlled valve arranged in said pipe whereby the receptacle is kept filled with water at a predetermined level, an absorbent material arranged around the outside of the tank, a wick arranged around the outer face of said receptacle in position to be saturated by the overflow water from said receptacle and to convey said overflow water to the absorbent covering of the tank, and means for regulating the amount of water supplied to the tank.

2. In a cooler, a tank having in its upper end a water receptacle, a water supply pipe connected with said tank, an automatically controlled valve arranged in said pipe, whereby the water supply is cut off from said tank when said water has reached a predetermined level in the tank, an automatically controlled valve arranged in said pipe whereby the water receptacle in the upper end of the tank is kept filled to a predetermined level, an absorbent material arranged around the outer side of the tank, means to feed the water from said receptacle to said absorbent material whereby the latter is kept wet.

3. In a cooler, a tank having in its upper end a water receptacle, a water supply pipe connected with said tank, a cut-off valve arranged in said pipe, a tube arranged in the upper end of the tank and projecting upwardly through the receptacle in the upper end of the tank, a float arranged in the tank and connected through said tube with the stem of said cut-off valve, whereby when the water in the tank has reached a predetermined level, said cut-off valve will be closed, and when the water is lowered below said level, the valve will be opened, a float operated supply valve arranged in said supply pipe to control the supply of water to the receptacle in the upper end of said tank, an overflow pipe connected with said receptacle, an absorbent material arranged around said tank, and means whereby said absorbent material is kept wet from the water in said receptacle.

In testimony whereof I have hereunto set my hand in presence of two subscribing witnesses.

RALPH WALDO AMMONS.

Witnesses:
ROSWELL M. WILBUR,
HOMER A. BOWER.